United States Patent [19]

Eshghy

[11] 4,034,776
[45] July 12, 1977

[54] BALANCED PLUG VALVE

[75] Inventor: Siavash Eshghy, Pittsburgh, Pa.

[73] Assignee: Rockwell International Corporation, Pittsburgh, Pa.

[21] Appl. No.: 625,593

[22] Filed: Oct. 24, 1975

[51] Int. Cl.² .................... F16K 5/16; F16K 5/22
[52] U.S. Cl. ......................... 137/246.22; 251/283
[58] Field of Search ................... 137/246–246.23; 251/281, 283, 309, 312

[56] References Cited

U.S. PATENT DOCUMENTS

| | | | |
|---|---|---|---|
| 1,584,699 | 5/1926 | Davenport | 137/246.12 |
| 1,680,812 | 8/1928 | Sloan | 251/283 |
| 2,945,668 | 7/1960 | Staller et al. | 251/283 X |
| 3,115,151 | 12/1963 | Manor et al. | 251/283 X |

Primary Examiner—Martin P. Schwadron
Assistant Examiner—Richard Gerard

[57] ABSTRACT

A valve comprising a casing having a passageway therethrough for flow of fluid and a tapered bore intersecting the passageway, a tapered plug rotatably mounted in the tapered bore adapted to block the passageway in valve closed position of the plug and the plug having a port adapted to connect and be in communication with the passageway in valve open position, the plug and casing providing chambers at opposite ends of the tapered plug, means for connecting the chambers to the port to dynamically balance the plug within the casing when the plug is partially or fully open, a biasing means is provided in the casing to axially bias the tapered plug in the direction of the larger end of the plug.

11 Claims, 3 Drawing Figures

BALANCED PLUG VALVE

BACKGROUND OF THE INVENTION

The present invention relates to plug valves and, more particularly, to tapered plug valves.

Experimentation has been directed to reducing and/or eliminating the lockup phenomenon as applied to said tapered plug valves. The basic thrust of this experimentation is directed to the elimination of the interference lockup or pinching believed to be critical when a tapered plug valve is in the open or partially open position. It has been found and is generally believed that a pressure pulse in the line in which the valve is connected and/or the weight of the plug when unfavorably orientated will first cause sticking; then if the line pressure is reduced, an interface pressure is created which will give rise to a high frictional resistance between the casing and the plug thus rendering the valve extremely difficult to close. The need has become apparent therefore for a tapered plug valve in which hydraulic and/or gravitational forces exerted on the plug with a finite component toward the cone or taper apex are eliminated.

SUMMARY OF THE INVENTION

It is therefore a primary object of the present invention to provide a tapered plug valve in which all the chambers surrounding the plug are in communication hydraulically and to provide means of exerting a force on the plug away from the apex (i.e., in the small-to-large-end direction). This force is of such magnitude to overcome the plug weight and second-order hydraulic forces which exist during line pressure transients.

It is therefore a primary object of the present invention to provide a tapered plug valve which is highly effective and efficient with a dynamically balanced plug which renders the valve immune from the lockup phenomenon.

It is another important object of the present invention to provide a tapered plug valve in which the persistent forces are overcome thereby balancing the tapered plug along its axis within the casing.

It is another primary object of the present invention to provide a tapered plug valve comprising a casing having a passageway therethrough for flow of fluid and a tapered bore intersecting the passageway, a taper plug rotatably mounted in said tapered bore adapted to block the passageway in valve closed position of the plug and the plug having a port adapted to connect and be in communication with the passageway in valve open position, said plug and casing providing chambers at opposite ends of said tapered plug, means for connecting the chambers to the port to dynamically balance the plug within the casing when the plug is partially or fully open.

It is a further object of the present invention to provide a tapered plug valve wherein a biasing means is provided in said casing to axially bias said tapered plug in the direction of the larger end of the plug.

It is another object of the present invention to provide a tapered plug valve wherein said biasing means is provided in said chamber nearest the smaller end of said tapered plug axially biasing the plug towards the other of the chambers.

It is still a further object of the present invention to provide a tapered plug valve wherein said means for connecting the chambers to the port includes at least one opening in each end of the plug, said openings connecting both the chambers to the port.

It is also a further object of the present invention to provide a tapered plug valve wherein there are two said openings, one in each end of the plug.

It is yet another object of the present invention to provide a tapered plug valve wherein one of said chambers is adapted to receive a lubricant, means provided in the connecting means to check the flow of lubricant into the port when the pressure in the chamber exceeds the pressure in the port.

It is again another object of the present invention to provide a tapered plug valve wherein said means provided in said connecting means to check the flow of lubricant into the port includes a balance check ball.

It is yet a further object of the present invention to provide a tapered plug valve wherein said chamber adapted to receive a lubricant is the chamber in the smaller end of said plug.

It is another object of the present invention to provide a tapered plug valve wherein said connecting means communicating the chamber with said port of the plug is centrally disposed in the plug and on the longitudinal axis thereof.

It is a further object of the present invention to provide a tapered plug valve wherein said biasing means is a helically wound spring axially biasing the plug.

It is another object of the present invention to provide a tapered plug valve wherein the spring is centrally disposed with respect to the longitudinal axis of the plug.

Further objects of the present invention will become apparent as the description proceeds in connection with the appended claims and the annexed drawings described below.

DESCRIPTION OF THE INVENTION

Figure 2:
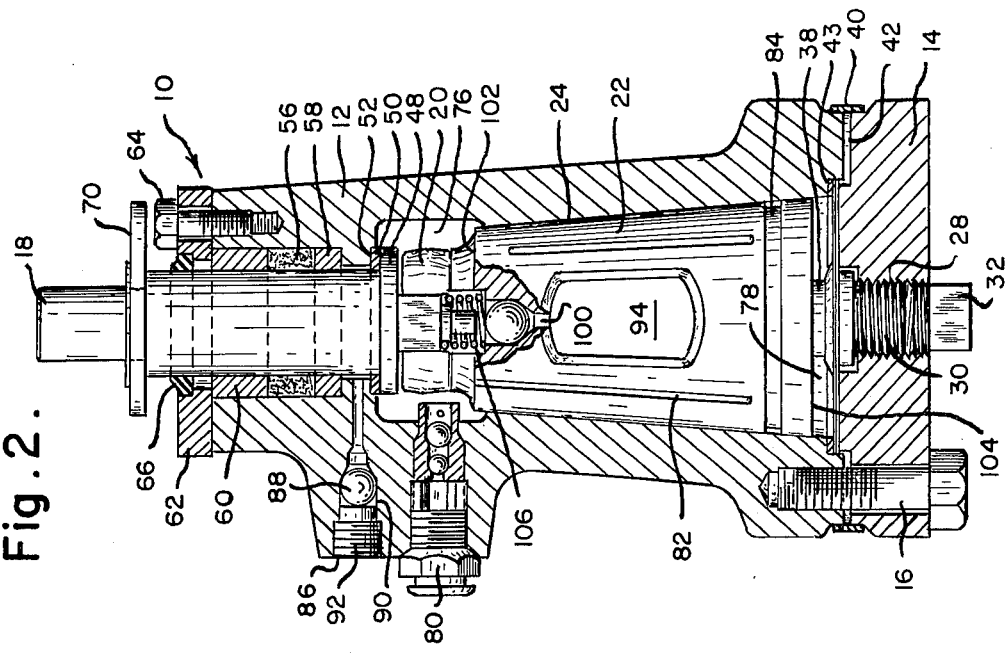
FIG. 2 is another sectional view of the tapered plug valve in accordance with the present invention wherein the tapered plug valve of FIG. 1 is rotated approximately 90°.
Figure 1:
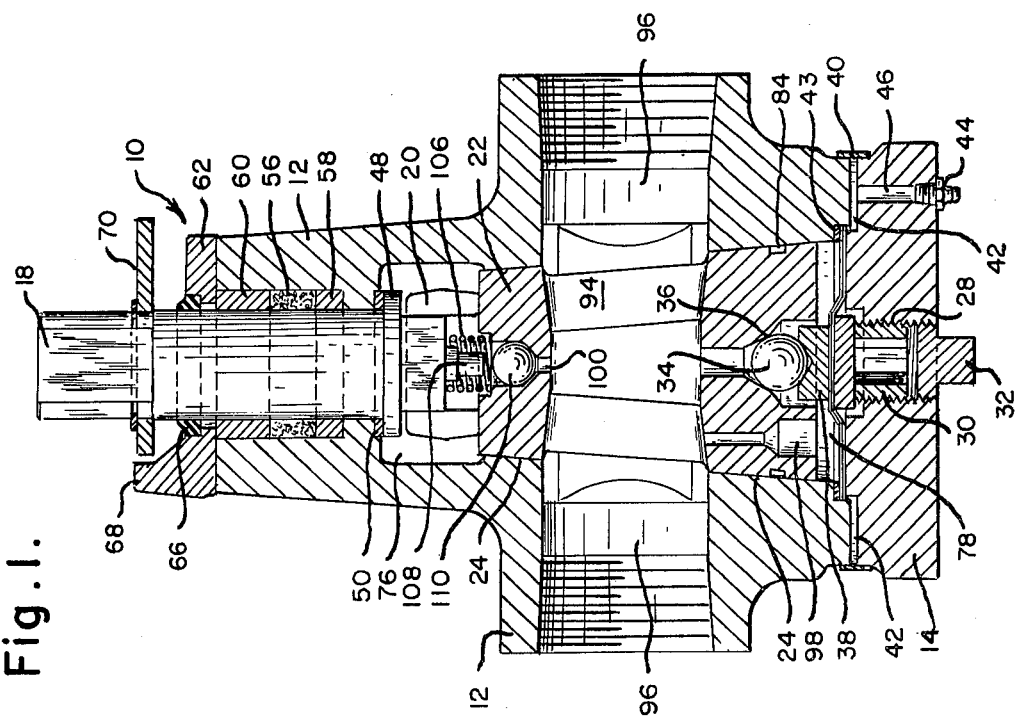
FIG. 1 is a partial sectional view of a tapered plug valve in accordance with the present invention.
Figure 3:
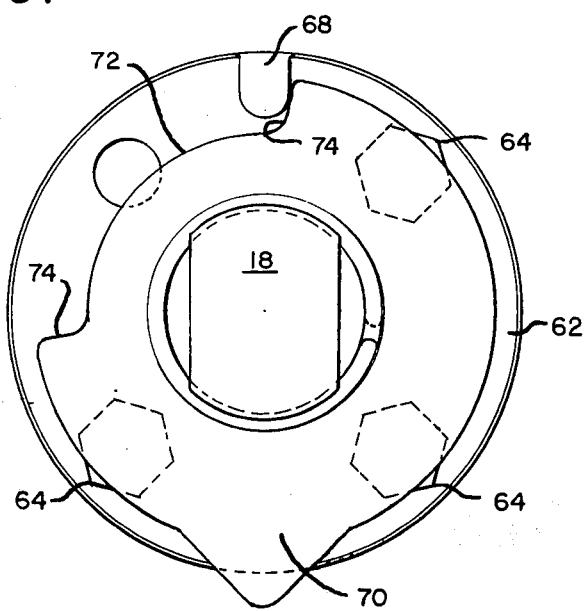
FIG. 3 is a top view of the tapered plug valve of FIG. 1.

Referring now to the drawings, there is shown an improved tapered plug valve 10 according to a preferred embodiment of the present invention. The tapered plug valve 10 is highly adaptable to many applications and requirements as is well known by those having ordinary skill in this art. For example, the tapered plug valve as contemplated by this invention may be used in oil and gas production, refining and transmission apparatus, flow systems of all kinds, and the like.

The tapered plug valve 10 is provided with a casing 12. Typically, the casing 12 is a cast part which in turn is machined and otherwise suitably prepared for the operational introduction of its various parts. The casing 12 is so arranged as to receive an end cap 14. The end cap 14 may be adapted to the casing by suitable attaching means such as a series of threaded bolts 16. With the end cap removed, all the various operational parts, which will be below further described, may be introduced into the casing 12. That is, the stem 18 coupling member or equalizing ring 20 and plug 22 all may be loaded or assembled within the casing from the bottom.

The stem 18 is rotatably mounted within the casing 12 and is mechanically coupled to the equalizer ring 20. The equalizer ring 20 is mechanically coupled to the plug 22 which is rotatably mounted within the casing 12 at a tapered interface 24. As can immediately be seen, rotation of the stem 18 will in turn cause rotation of the plug 22 through the equalizer ring 20 which mechanically couples the stem 18 to the plug 22. The end cap 14 is also provided with a threaded cavity 28 which is adapted to threadably receive a plug adjusting screw or stop 30 and a protective cap 32. The plug adjusting screw 30, as the name implies, is adapted to adjust the axial position of the plug 22 within the casing 12. This adjustment is achieved through the provision of a spherical plug thrust ball 34 supported within a cavity 36 in the lower end of the plug 22 and on ball seat 38. The ball seat 38 is responsive to axial movement of the plug adjusting screw 30 which, for example, when threadably moved inwardly with respect to the end cap 14 drives the plug 22 toward the apex of the taper.

A band seal 40 may also be provided around the juncture of the casing 12 and end cap 14 to seal the void 42 between the two members from the environment. The sealing of the void is further enhanced by the provision of a grease fitting 44 provided in a bore 46 in the end cap 14 for applying grease under pressure to the above noted void 42. It should be noted that the grease will completely fill the void 42 and surround the threaded bolts 16 thereby preserving the threads on the threaded bolt 16 from any adverse substance or environment.

A seal is maintained between the end cap 14 and the casing 12 by the provision of an annular seal or gasket 43.

As before mentioned, the stem 18 is rotatably supported within the casing 12 and is further provided with an annular rim 48 which abuts an annular thrust bearing and seal 50. The seal 50 is mounted within a complementary groove 52 disposed in the casing 12 and the seal 50 completely surrounds the stem 18. The stem may be suitably coated with a self-lubricating plastic such as polytetrafluoroethylene in the area of the thrust bearing and seal 50 to enhance its rotative characteristics. The thrust bearing and seal 50 is assembled with a stem 18 when the stem 18 is assembled through the lower end of the casing 12.

The primary sealing of the stem 18 is provided by a series of sealing members provided in the casing above the annular rib disposed on the casing 12. A typical arrangement of packing or seals 56 is a Uneepac Ring Set manufactured by Johns-Manville which may include a series of flat bottom rings and regular rings. The seals 56 may be held in their operational position by stem rings 58 and 60. The upper stem ring 60 typically may abut a stem cap 62 which may be suitably attached to the casing 12 by attaching means such as a series of threaded bolts 64. The stem cap 62 serves several functions including, as before mentioned, the maintenance of the axial position of the stem rings 58 and 60 and their associated seal 56; and the sealing of the stem from the environment by the provision of a weather seal 66 as typically manufactured by Johns-Manville as their Wiper Construction II, Type P; and also as a reference stop by the provision of a stop member 68. The stop member 68 coacts with a stop collar 70 which is affixed to the stem 18 to rotate therewith. The stop collar 70 is provided with a cut away section 72 with lands 74 at each end thereof which restrict the rotational movement of the stem to a predetermined arc. The restriction of the movement of the stem 18 is effected by the stop collar 70 abutting the stop member 68 at either of its lands 74.

As can be seen in either of the sectional views of the valve 10, the casing 12 and the tapered plug 22 define an upper chamber 76 and a lower chamber 78. A check valve assembly 80 is provided for the introduction of a sealant lubricant into the upper chamber 76 and said sealant lubricant may be introduced therein under pressure. The sealant lubricant as it flows into and fills the upper chamber 76 will also flow into axially extending grooves 82 and a circumferential groove 84. As the name sealant lubricant implies, the material serves the dual purpose of lubricating the various operational parts of the valve 10 while at the same time it seals the plug with respect to the casing.

The valve 10 is also provided with a pressure relief screw arrangement 86 which comprises a spherical ball 88 received within a partially threaded cavity 90 within the casing 12. The spherical ball 88 is maintained in a sealed position by a set screw 92. The operation of the relief screw arrangement will be below further described.

The present invention provides immunity to the lockup phenomenon by the provision of dynamically balancing the plug 22 in the casing 12 when the plug 22 is partially or fully open, i.e., when the port 94 of the plug 22 is connected to and in communication with the passageway 96 through the casing 12. The dynamic balancing feature of the valve 10 is achieved by the provision of a first axially extending opening 98 in the plug 22 connecting the port 94 to the lower chamber 78 and the provision of a second axially extending opening 100 in the plug 22 connecting the port 94 to the upper chamber 76. The opening 98 may be offset from the longitudinal axis of the plug 22 while the opening 100 may be disposed on said longitudinal axis.

At this juncture, it can be seen that the pressure seen by the port 94 when the plug 22 is in its partially open or fully open position is also simultaneously seen by the upper chamber 76 and the lower chamber 78. Accordingly, the pressure seen by the chambers 76 and 78 will also be seen by the smaller end 102 of the plug 22 and the larger end 104 of the plug 22, respectively. Pressure exerted on the smaller end 102 and the larger end 104 of the plug 22 will tend to maintain the axial position of the plug 22 with respect to the tapered interface 24 within the casing 12 at all times even through pressure and temperature transient. However, there has been noted that there will tend to be a slight unequal pressure exerted toward the apex of the taper due to secondary forces. These secondary forces may be caused by a number of different factors. For example, gravity may tend to force the plug 22 toward the apex of the taper when the weight of the plug 22 is in an unfavorable orientation with respect to the casing 12. A secondary force may also occur when the valve 10 is experiencing a pressure transient particularly when the pressure is rising in the port 94. During such a pressure rise, the pressure seen by the side contact area between the plug 22 and casing 12 will lag the pressure seen by port 94 and chambers 76 and 78 resulting in a force vector tending to force the plug 22 toward the apex of the taper. This pressure lag and the dislocating force will be at their maximum when the valve is in its fully open position. To offset these secondary forces, a helically wound spring 106 which may be disposed on the longitudinal axis of the plug 22 biases the plug 22 along said longitudinal axis away from the apex of the taper. The spring 106 is mounted on an extension 108 of the stem and, as before mentioned, abuts and biases the plug 22. Therefore, the plug 22 will see virtually no axially dislocating forces as it experiences pressure and/or temperature transient in its partially open or fully open position. The avoidance of such axial dislocation of the plug also avoids the lockup phenomenon in that the plug 22 maintains its axial position within the casing 12 and is not driven into the taper and thus pinched by the casing after the stabilization of a pressure or temperature transient.

The second axially extending opening 100 is also provided with a spherical ball 110 seated therein. The spherical ball, which is not biased by the spring 106, is free floating within the second axially extending opening and serves as a check valve, checking the flow of the sealant lubricant into the port 94 of the plug 22 when the sealant lubricant is introduced into the upper chamber 76 under pressure. The spherical ball 110, however, would not be needed if the sealant lubricant was introduced directly into the sealant channel system rather than into the upper chamber 76 by a suitable valve assembly (not shown). This could, for example, be achieved by introducing the sealant directly into the circumferential groove 84.

As before mentioned, the various operational parts of the valve 10 may be assembled through the end of the casing through the opening covered by the end cap 14, i.e., the stem 18, thrust bearing and seal 50, equalizer ring 20, spring 106, spherical ball 110, plug 22, spherical plug thrust ball 34, etc. This configuration of the various parts allows the valve stem seal 56 to be serviced while the valve is exposed to line pressure. More specifically, the seal 56 may be removed even though the valve 10 is connected to the line and under pressure. This is achieved by the removal of the stop collar 70 from the stem 18 and the removal of the stem cap 62 from the casing 12 by the removal of the bolts 64. After the above noted parts are removed the seal 56 and stem rings are exposed and may be removed. At this point the primary seal is provided by the thrust bearing and seal 50. To ensure that the thrust bearing and seal 50 is operating properly so as to allow the removal of the above noted face of the seal and its associated stem rings 60 and 62 the set screw 92 may be partially removed, thereby allowing the spherical ball 88 to unseat. The operator may immediately tell if the thrust bearing and seal 50 is suitably sealing the stem at the complementary groove 52. If the thrust bearing and seal 50 is performing its function adequately, then the removal of the seal 56 can be initiated.

There is thus provided a uniquely configured tapered plug valve in which the valve 10 is dynamically balanced within the casing when the plug valve is in its partially open or fully open position and even when the valve 10 is exposed to pressure and temperature transient.

Obviously, the present invention is not limited to the specific details as herein described, but is capable of other modifications and changes without departing from the spirit and scope of the appended claims.

What is claimed is:

1. A tapered plug valve comprising: a casing having a passageway therethrough for flow of fluid and a tapered bore intersecting said passageway; a tapered plug rotatably mounted in said tapered bore adapted to block said passageway in a valve closed position of said plug, said plug having a port adapted to connect and be in communication with said passageway in a valve open position, said plug and said casing providing an apex chamber at the small end of said tapered plug and a base chamber at the large end of the plug; means operative during valve open or valve partially open dynamic conditions for maintaining the axial position of the plug within the bore of the casing to prevent axial movement toward the apex chamber, said means including (1) stop means limiting axial movement of the plug toward one of the chambers (2) passage means for fluidly communicating both chambers to said port and (3) biasing means urging said plug toward said stop means thereby providing dynamic balancing of the plug in the casing.

2. The tapered plug valve recited in claim 1 wherein said biasing means is provided in the apex chamber and engages the small end of the tapered plug to cause said engagement with said stop means.

3. A tapered plug valve in accordance with claim 2 wherein said biasing means is a helically wound spring axially biasing said plug.

4. A tapered plug valve in accordance with claim 3 wherein the said spring is centrally disposed with respect to the longitudinal axis of said plug.

5. The tapered plug valve recited in claim 1 wherein said passage means for communicating both chambers to port include a first opening in the plug extending between the port and the base chamber and a second opening in the plug extending between the port and the apex chamber.

6. The tapered plug valve recited in claim 1 wherein said stop means is provided in the base chamber and directly engages and fixedly positions the larger end of said plug, said stop means being adjustable to vary the axial position of the plug within the casing.

7. A tapered plug valve in accordance with claim 1 wherein one of said chambers is adapted to receive a lubricant, and means are provided in said passage means to check the flow of lubricant into said port when the pressure in said chamber exceeds the pressure in said port.

8. A tapered plug valve in accordance with claim 7 wherein said means provided in said passage means to check the flow of lubricant into said port includes a balanced check ball.

9. A tapered plug valve in accordance with claim 8 wherein said one of said chambers adapted to receive a lubricant is the apex chamber at the smaller end of said plug.

10. A tapered plug valve in accordance with claim 9 wherein said passage means communicating said apex chamber with said port of said plug is centrally disposed in said plug and on the longitudinal axis thereof.

11. A balanced plug valve immune to interference lockup comprising: a casing; a conical tapered first bore formed in said casing along an axis; a flow passage formed in said casing transverse to said axis and having inner ends communicating with the tapered bore and outer ends adapted to be connected to a fluid flow line; a cylindrical second bore formed in said casing coaxial with the tapered first bore adjacent the smaller end thereof; a valve stem rotatably disposed in said second bore; a conical tapered plug adapted to be coaxially received in said first bore, said plug in a valve closed position having surfaces blocking said flow passage, said plug having a port formed therethrough transverse to said axis adapted to be fluidly connected to the inner ends of said passage when moved to a valve open position; means coupling said stem to said tapered plug whereby the latter may be rotated between said valve open position and said valve closed position by rotation of said stem; an end cap secured to said casing closing the large end of said tapered bore whereby the tapered plug in operative position defines with the casing and end cap a base chamber adjacent the larger end of the plug and an apex chamber adjacent the smaller end of the plug; an adjusting member threadedly extending through said end cap along said axis adjustably axially engaging the larger end of the plug to thereby establish an adjustable axial stop to limit movement of the plug toward said base chamber and establish a predetermined clearance relationship between said plug and tapered bore; a first passage formed in said tapered plug extending between said port and said base chamber in spaced relation to said axis; a second passage formed in said tapered plug extending between the apex chamber and said port along said axis whereby both chambers are communicated to said port such that the pressures therein are substantially identical as the valve moves toward the open position, the force differential acting toward the apex chamber during opening providing a slightly unequal force due to secondary forces including pressure transients caused by pressure rise in the port so that the pressure seen by the interface between the plug and the casing lags the pressure seen by the port and the first bore thereby resulting in a force vector tending to force the plug towards the apex chamber, such forces being at their maximum value when the valve is at its fully opened position; a helically wound compression spring disposed along said axis in said apex chamber biasing said plug along said axis away from said apex toward said adjusting member so as to maintain the axial position of the plug within the casing to counteract the gravitational force due to physical orientation of the plug and said force vector of said pressure transients thereby avoiding lockup after stabilization of any pressure or temperature transients.

* * * * *